(12) United States Patent
Pang et al.

(10) Patent No.: US 12,400,073 B2
(45) Date of Patent: Aug. 26, 2025

(54) SYSTEMS AND METHODS FOR SHARED LATENT SPACE PROMPT TUNING

(71) Applicant: Salesforce, Inc., San Francisco, CA (US)

(72) Inventors: Bo Pang, Los Angeles, CA (US); Semih Yavuz, Redwood City, CA (US); Caiming Xiong, Menlo Park, CA (US); Yingbo Zhou, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 394 days.

(21) Appl. No.: 18/060,411

(22) Filed: Nov. 30, 2022

(65) Prior Publication Data

US 2023/0419027 A1    Dec. 28, 2023

Related U.S. Application Data

(60) Provisional application No. 63/355,468, filed on Jun. 24, 2022.

(51) Int. Cl.
| | |
|---|---|
| *G06F 40/20* | (2020.01) |
| *G06F 40/30* | (2020.01) |
| *G06N 3/044* | (2023.01) |
| *G06N 3/084* | (2023.01) |

(52) U.S. Cl.
CPC .......... *G06F 40/20* (2020.01); *G06N 3/084* (2013.01)

(58) Field of Classification Search
CPC ...... G06F 40/20; G06F 40/216; G06F 40/284; G06F 40/30; G06N 3/084; G06N 3/044; G06N 3/045
See application file for complete search history.

(56) References Cited

U.S. PATENT DOCUMENTS

| | | | | |
|---|---|---|---|---|
| 12,106,058 | B2 * | 10/2024 | Olabiyi | ................ G06N 3/045 |
| 2023/0244938 | A1 * | 8/2023 | Wei | ...................... G06N 3/045 |
| | | | | 706/25 |

(Continued)

OTHER PUBLICATIONS

Do Dung Vu, "Natural Language Generation for Intelligent Tutoring Systems," PhD Thesis, École De Technologie Supérieure, Université Du Québec, Montreal, May 16, 2022 (Year: 2022).*

(Continued)

*Primary Examiner* — Paras D Shah
*Assistant Examiner* — Mulugeta Tuji Dugda
(74) *Attorney, Agent, or Firm* — Haynes and Boone, LLP

(57) ABSTRACT

Embodiments described herein provide a prompt-based transfer learning method that employs shared latent space prompt tuning). Specifically, a shared latent space is assumed, among all source and target tasks, where each vector in the space captures a basis skill to do a particular task. Given an instance (from either a source task or a target task), it is first encoded into an instance representation vector and then queries the latent space, which yields a skill vector for this instance. This vector modulates a frozen model, via soft prompts which are a simple prompt transformation (the prompt generator in FIG. 3) of the basis skill vector, to generate an answer for the instance. The latent space and prompt transformation are learned end-to-end in upstream pre-training on source tasks.

16 Claims, 7 Drawing Sheets

(56) References Cited

U.S. PATENT DOCUMENTS

| | | | |
|---|---|---|---|
| 2023/0252224 A1* | 8/2023 | Tran | G06F 40/56 |
| | | | 715/256 |
| 2023/0280985 A1* | 9/2023 | Hayashi | G06N 3/045 |
| 2023/0351102 A1* | 11/2023 | Tran | G06N 3/045 |
| 2023/0377226 A1* | 11/2023 | Saharia | G06V 10/82 |

OTHER PUBLICATIONS

Brian Lester, Rami Al-Rfou, Noah Constant, "The Power of Scale for Parameter-Efficient Prompt Tuning," arXiv:2104.08691v2, https://doi.org/10.48550/arXiv.2104.08691, Thu, Sep. 2, 2021 (Year: 2021).*

Z. Zhang, Y. Gu, X. Han, S. Chen, C. Xiao, Z. Sun, Y. Yao, F. Qi, J. Guan, P. Ke, Y. Cai, G. Zeng, Z. Tan, Z. Liu, M. Huang, W. Han, Y. Liu, X. Zhu, M. Sun, "CPM-2: Large-scale cost-effective pre-trained language models", AI Open, vol. 2, 2021, pp. 216-224, ISSN 2666-6510 (Year: 2021).*

\* cited by examiner

|  | BoolQ | CB | CoLA | COPA | CR | MRPC | RTE | STS-B | WiC | WSC | Average |
|---|---|---|---|---|---|---|---|---|---|---|---|
| ModelTuning | 81.4 | 94.0 | 51.1 | 71.2 | 94.1 | 87.5 | 81.5 | 89.4 | 68.3 | 80.8 | 79.9 |
| SPoT-Oracle | 77.6 | 97.0 | 55.6 | 69.3 | 93.9 | 88.7 | 74.7 | 90.0 | 70.2 | 77.2 | 79.4 |
| PromptTuning | 73.0 | 92.7 | 52.9 | 56.7 | 93.5 | 86.1 | 68.7 | 88.1 | 63.6 | 71.5 | 74.7 |
| SPoT-Retrieval | 74.2 | 95.4 | 54.8 | 58.3 | 93.6 | 88.4 | 71.6 | 90.0 | 66.7 | 72.9 | 76.6 |
| SHARPT | 78.9 | 94.6 | 58.2 | 67.0 | 94.5 | 89.7 | 79.4 | 89.1 | 68.8 | 81.6 | 80.2 |

Table 1: Results on the high-to-low transfer learning setting. Methods in the upper panel are significantly more expensive than those in the lower panel. The best performance is in bold, and the second best is underlined.

FIG. 5

|  | COPA | CB | RTE | WSC | WiC |
|---|---|---|---|---|---|
| ModelTuning | 71.2 | 94.0 | 81.5 | 80.8 | 68.3 |
| SPoT-Oracle | 63.0 | 92.9 | 72.0 | 77.2 | 70.2 |
| PromptTuning | 56.7 | 92.7 | 68.7 | 71.5 | 63.6 |
| SPoT-Retrieval | 61.2 | 89.4 | 71.4 | 73.6 | 66.7 |
| SHARPT | 65.0 | 94.6 | 79.4 | 79.0 | 69.8 |

Table 2: Results on transferring across task categories.

FIG. 6

|  | BoolQ | CB | CoLA | COPA |
|---|---|---|---|---|
| SHARPT | 78.9 | 94.6 | 58.2 | 67.0 |
| No Source Task Training | 64.3 | 89.3 | 10.3 | 58.0 |
| No Latent Space | 67.9 | 82.4 | 17.6 | 61.0 |

Table 3: Ablation results.

FIG. 7

SYSTEMS AND METHODS FOR SHARED LATENT SPACE PROMPT TUNING

CROSS REFERENCES

The application is a nonprovisional of and claims priority to U.S. Provisional application No. 63/355,468, filed Jun. 24, 2022, which is hereby expressly incorporated by reference herein in its entirety.

TECHNICAL FIELD

The embodiments relate generally to natural language processing (NLP) models and machine learning systems, and more specifically to systems and methods for shared latent pace prompt tuning in language models.

BACKGROUND

Pre-trained language models (PLMs) may be finetuned to perform natural language processing tasks, such as question answering, sentiment classification, summarization, and/or the like. The finetuning often entails training the PLMs based on a training dataset that is specific to a certain NLP task, including updating all parameter weights of a PLM for a downstream task (i.e., MODELTUNING). This approach is however prohibitively expensive, especially given the growing sizes of PLMs, which may include tens of thousands of parameters.

Therefore, there is a need for efficient methods to adapt PLMs in various natural language processing tasks.

BRIEF DESCRIPTION OF THE DRAWINGS

FIGS. 5-9 provide example data charts and performance plots illustrating example performance of the shared prompt-tuning framework described herein.

Figure 1:
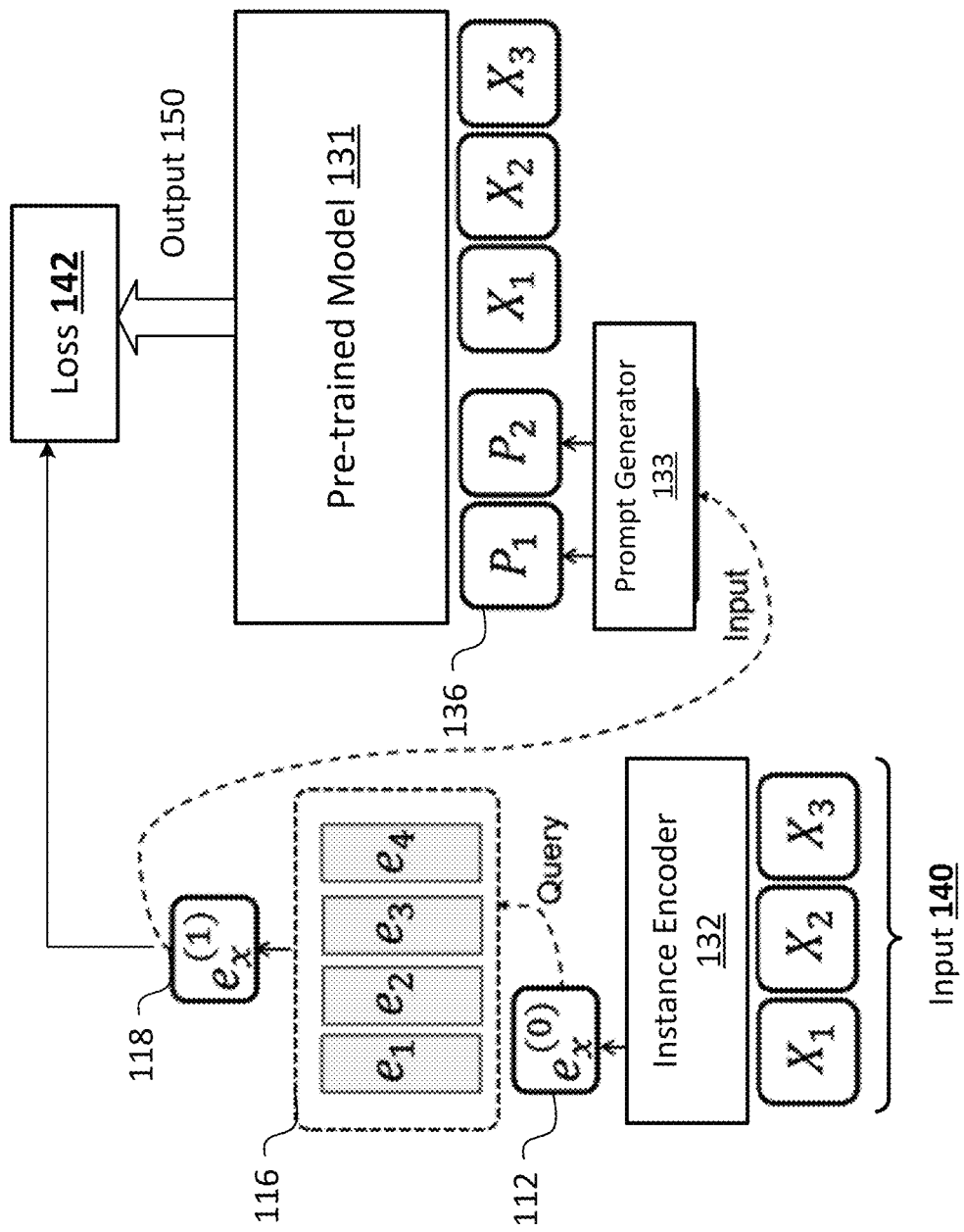
FIG. 1 is an example block diagram illustrating a shared latent space prompt tuning framework, according to embodiments described herein.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Finetuning all parameter weights of a PLM on a downstream task (i.e., MODELTUNING) can be prohibitively expensive, especially given the growing sizes of PLMs. Instead of finetuning all parameters of language models for each downstream task, prompt models may be used to modulate a frozen LLM for a downstream task. For example, the input training text may be prepended with a prompt, which often consists of a task description and several examples, e.g., "the user intends to {check account balance, make a deposit, dispute a charge}." Such prompts can effectively adapt a large PLM, such as a frozen GPT-3. This approach, however, does not achieve comparable performance with MODELTUNING and is sensitive to choice of the wording of the prompt. Alternatively, instead of actual text (or hard prompt), a soft prompt, consisting of k tunable tokens, may be prepended to the input text. The soft prompt can be optimized with gradient-based methods for each downstream task. Soft prompt tuning may achieve comparable performance with MODELTUNING when the model size is large (e.g., over 10B parameters) but still underperforms with smaller models.

Some other existing approaches may leverage knowledge as encoded in soft prompts, shared across tasks. In particular, a task-specific soft prompt may be learnt for each task in a set of source tasks. Given a target task, the set of source prompts are searched and the best one or some weighted combination of the searches are used to initialize the prompt for the target task and then to tune the prompt. While these methods may further improve the performance with smaller models (e.g., 200M parameters), tuning and search prompts can be complicated and expensive to identify the source task that provides optimal prompts.

Embodiments described herein provide a prompt-based transfer learning method that employs shared latent space prompt tuning. Specifically, a shared latent space is assumed, among all source and target tasks, where each vector in the space captures a basis skill to do a particular task. Given an instance (from either a source task or a target task), it is first encoded into an instance representation vector and then queries the latent space, which yields a skill vector for this instance. This vector modulates a frozen model, via soft prompts which are a simple prompt transformation (the prompt generator in FIG. 3) of the basis skill vector, to generate an answer for the instance. The latent space and prompt transformation are learned end-to-end in upstream pre-training on source tasks.

In this way, the shared prompt-tuning improves parameter-efficiency by only updating a small amount of, e.g., 0.1% to 0.3% parameters of the frozen backbone model. As the instance encoder is always frozen, the embeddings of all instances can be pre-computed and only keep the embeddings. Thus, memory and time can be saved.

Overview

FIG. 1 is an example block diagram illustrating a shared latent space prompt tuning framework, according to embodiments described herein. The prompt tuning framework shows an instance encoder 132, a prompt generator 133 and a pre-trained language model (PLM) 131 that are communicatively coupled and may be operated concurrently, independently or inter-dependently.

Traditionally, given a NLP task (e.g., summarization, question answering, intent classification, etc.) and corresponding training dataset T={(x,y)} and a PLM such as 131, the traditional MODULE TUNING method updates all parameters θ of the PLM to minimize a loss objective: L(θ)=— log log P_θ(x), e.g., to maximize the conditional probability of generating an output y given an input x.

In the shared latent space prompt tuning framework as shown in FIG. 1, an input instance x 140 from the training set, as denoted by {X1, X2, X3} (e.g., a sequence of NLP tokens), is encoded by the instance encoder 132 into an encoded vector 112, denoted by $e_x^{(0)}$. The discrete latent space 116 of the encoded vector $e_x^{(0)}$ consists of a set of skill vectors E={$e_i \in R^m$}$_{i=1}^{K}$. Given the input instance x, the encoded vector 112 may then be used to query the latent space E to find the nearest neighbor to the encoded vector $e_x^{(0)}$, resulting in a skill vector $e_x^{(1)}$ 118:

$$e_x^{(1)} = e_k, k = \arg\operatorname*{argmin}_{i \in [K]} \|e_x^{(0)} - e_i\|_2.$$

The skill vector $e_x^{(1)}$ 118 is then transformed by a lightweight prompt generator 133 to generate soft prompt p=$f_\alpha$($e_x^{(1)}$). For example, the prompt generator $f_\alpha$ is a lightweight multi-layer perceptron (MLP) that transforms the skill vector by:

$$e_x^{(1)'} = \tan h(W_1 e_x^{(1)} + b_1), p_l = W_2(z_l + e_x^{(1)'}) + b_2,$$

where $z_l \in R^d$ is the position embedding for the lth token and $W_1 \in R^{d \times m}$, $W_2 \in R^{d \times d}$. Thus, the soft prompt generator 133 generates p={$p_l$}$_{l=1}^{L}$ soft prompts, where p∈$R^{L \times d}$ has L vectors of size d.

The prompt tokens 136 are represented by {P1, P2} shown in FIG. 1. It is noted that soft tokens {P1, P2} are for illustrative purpose only. Any different number of tokens may be used for the soft prompts. The prompt tokens 136 are prepended to the instance tokens 140 to form an input sequence to the pre-trained model 131. The pre-trained model 131 then generates a task-specific output y 150. Then, for a target task, the loss module 142 computes a loss:

$$L(\alpha) = -\log \log P_\theta(f_\alpha(e_k), x).$$

In target task training aforementioned, the latent space E 116 is known and fixed. However, for source tasks, the latent space needs to be learnt. For example, if the training dataset comprises data corresponding to N sources tasks, {$T_j^{(s)}$}$_{j=1}^{N}$, the set of data of all tasks may be mixed together, $T^{(s)} = U_{j=1}^{N} T_j^{(s)}$). Given x∈$T^{(s)}$, its embedding $e_x^{(0)}$ may be generated by the instance encoder 132. Then, without knowing the latent space for $e_x^{(0)}$, a loss is computed to learn the latent space E:

$$L(E) = \|sg(e_x^{(0)}) - e_k\|_2,$$

where sg( ) is a stop gradient operator and e k is the nearest neighbor for $e_x^{(0)}$ as discussed above. The overall loss in source task learning is, $$L(\alpha, E) = L(\alpha) + L(E).$$

Therefore, the forward pass for training on source and target tasks are exactly the same. For source task training data, the training loss objective is computed as L(α, E), while for target task training data, the loss is computed as L(α).

After the loss module 142 computes the respective losses, the instance encoder 132 and the pre-trained model 131 are frozen in all scenarios. The skill vectors in the latent space 116 and the prompt generator 133 are updated in source task training based on L(α, E). The skill vectors in the latent space 116 is frozen in target task training (as defined for each individual target task), and the prompt generator is updated based on L(α).

In this way, the shared latent space prompt tuning framework may train the prompt generator for a diverse set of tasks covering diverse domains and task categories. Specifically, a shared latent skill space which is learned end-to-end from a mixture of all source tasks in a single training run. Also, the tuning on the target task only requires a single run.

Computer and Networked Environments

Figure 2:
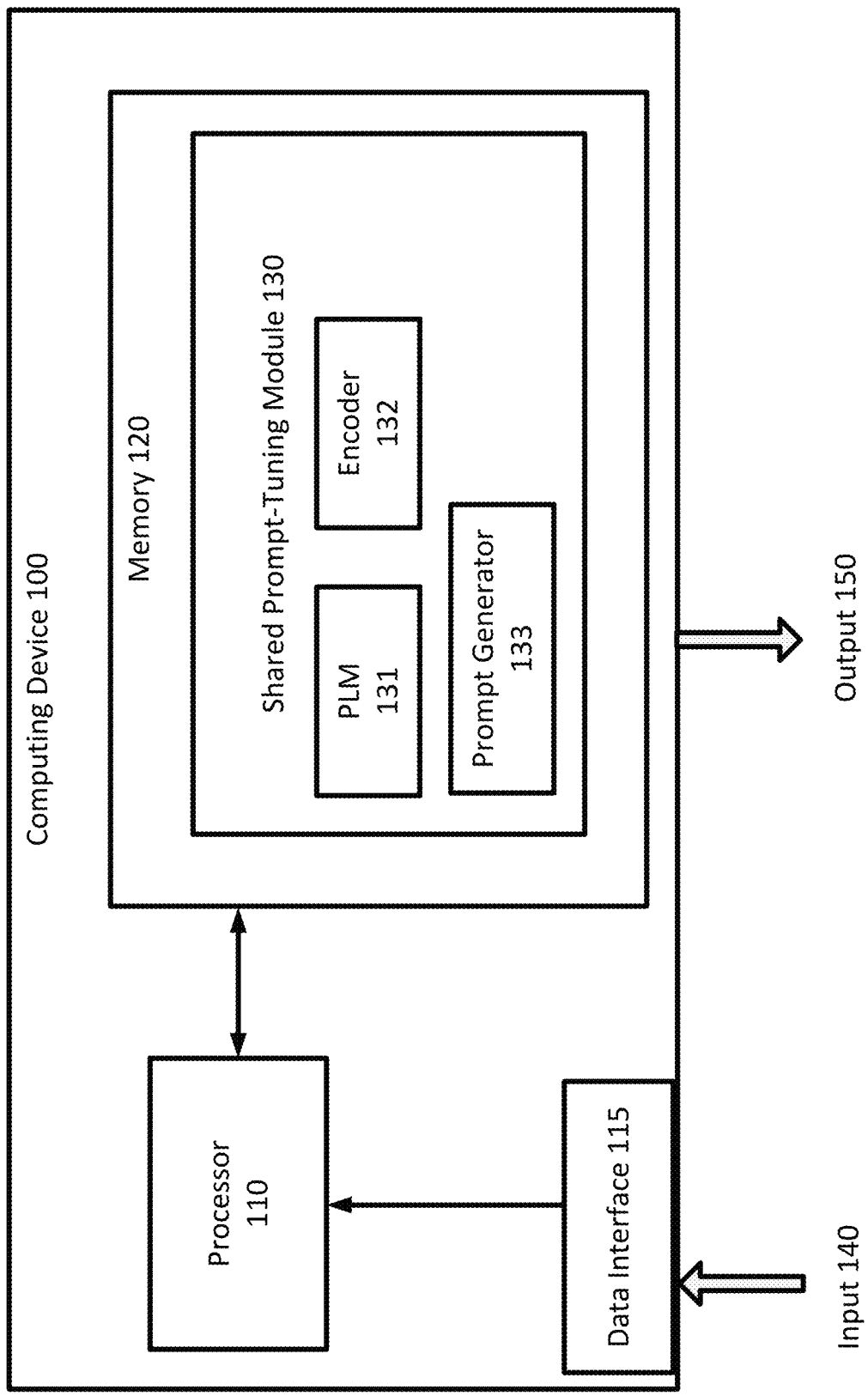
FIG. 2 is a simplified diagram illustrating a computing device implementing the shared prompt-tuning model described in FIG. 1, according to one embodiment described herein.

FIG. 2 is a simplified diagram illustrating a computing device implementing the shared prompt-tuning model described in FIG. 1, according to one embodiment described herein. As shown in FIG. 2, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for shared prompt-tuning module 130 that may be used to implement and/or emulate the systems and models, and/or to implement any of the methods described further herein. A shared prompt-tuning module 130 may receive input 140 such as a text input via the data interface 115 and generate an output 150 which may be an answer to the question, and/or the like. Examples of the input data may include a textual question, a sentence and/or the like. Examples of the output data may include a text classification, an answer, and/or the like.

The data interface 115 may comprise a communication interface, a user interface (such as a voice input interface, a graphical user interface, and/or the like). For example, the computing device 100 may receive the input 140 (such as a training dataset) from a networked database via a communication interface. Or the computing device 100 may receive the input 140, such as an articulated question, from a user via the user interface.

In some embodiments, the shared prompt-tuning module 130 is configured to be trained for various NLU tasks. The shared prompt-tuning module 130 may further include a pretrained PLM submodule 131, an instance encoder 132 and a prompt generator submodule 133, which are all further described in relation to FIG. 3. In one embodiment, the shared prompt-tuning module 130 and its submodules 131-133 may be implemented by hardware, software and/or a combination thereof.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
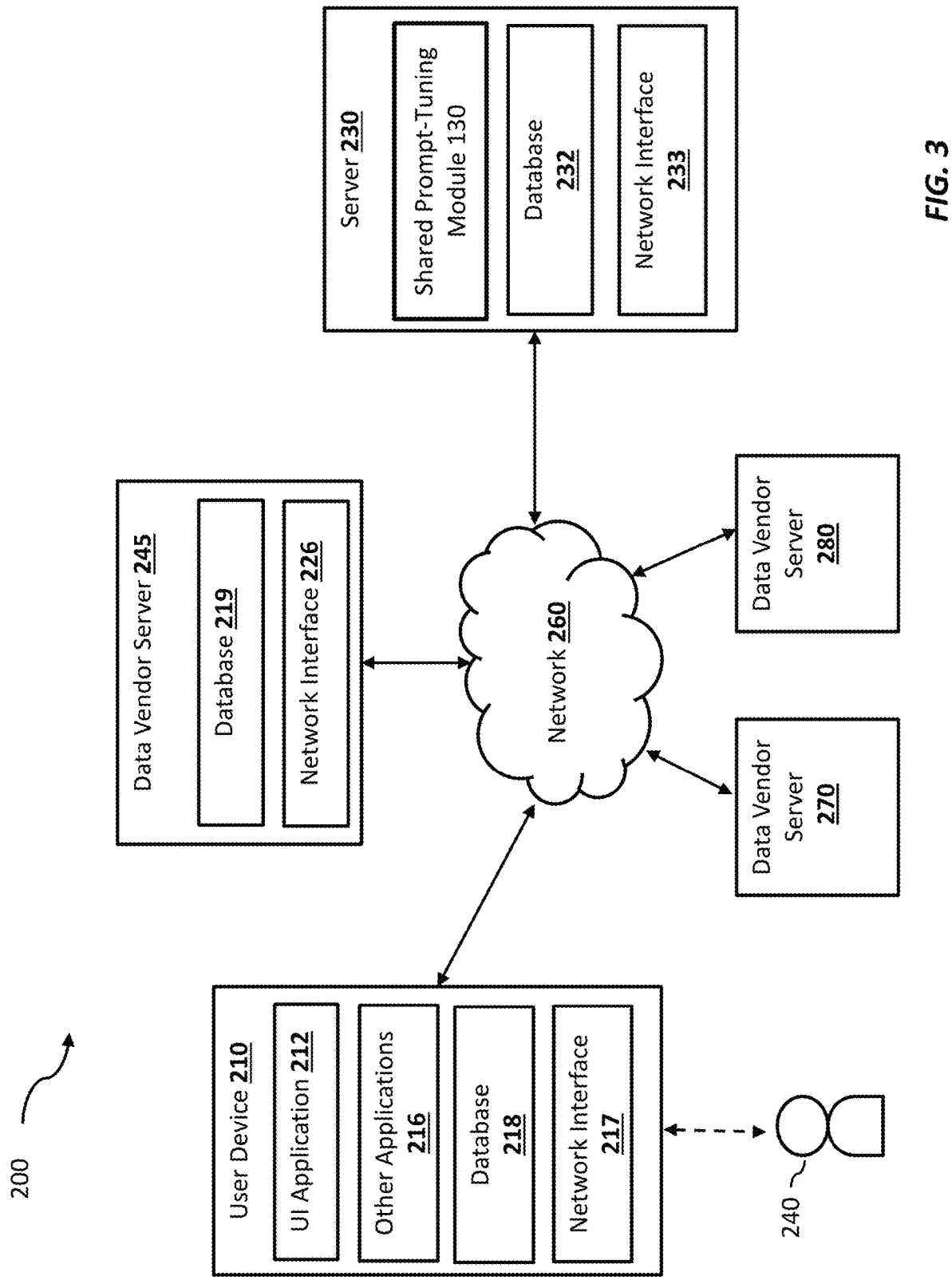
FIG. 3 is a simplified diagram illustrating a networked system implementing the shared prompt-tuning model described in FIG. 1, according to one embodiment described herein.

FIG. 3 is a simplified diagram illustrating a networked system implementing the shared prompt-tuning framework described in FIG. 1, according to one embodiment described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message indicating an answer to a question from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the answer.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203a-n (or collectively referred to as 203) to provide training datasets including training images and questions to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the shared prompt-tuning module 130 and its submodules described in FIG. 2. In some implementations, module 130 may receive data from database 219 at the data vendor server 245 via the network 260 to generate an answer to a visual question. The generated answer may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the multilingual model 130. In one implementation, the database 232 may store previously generated answers, and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Example Work Flows

Figure 4A:
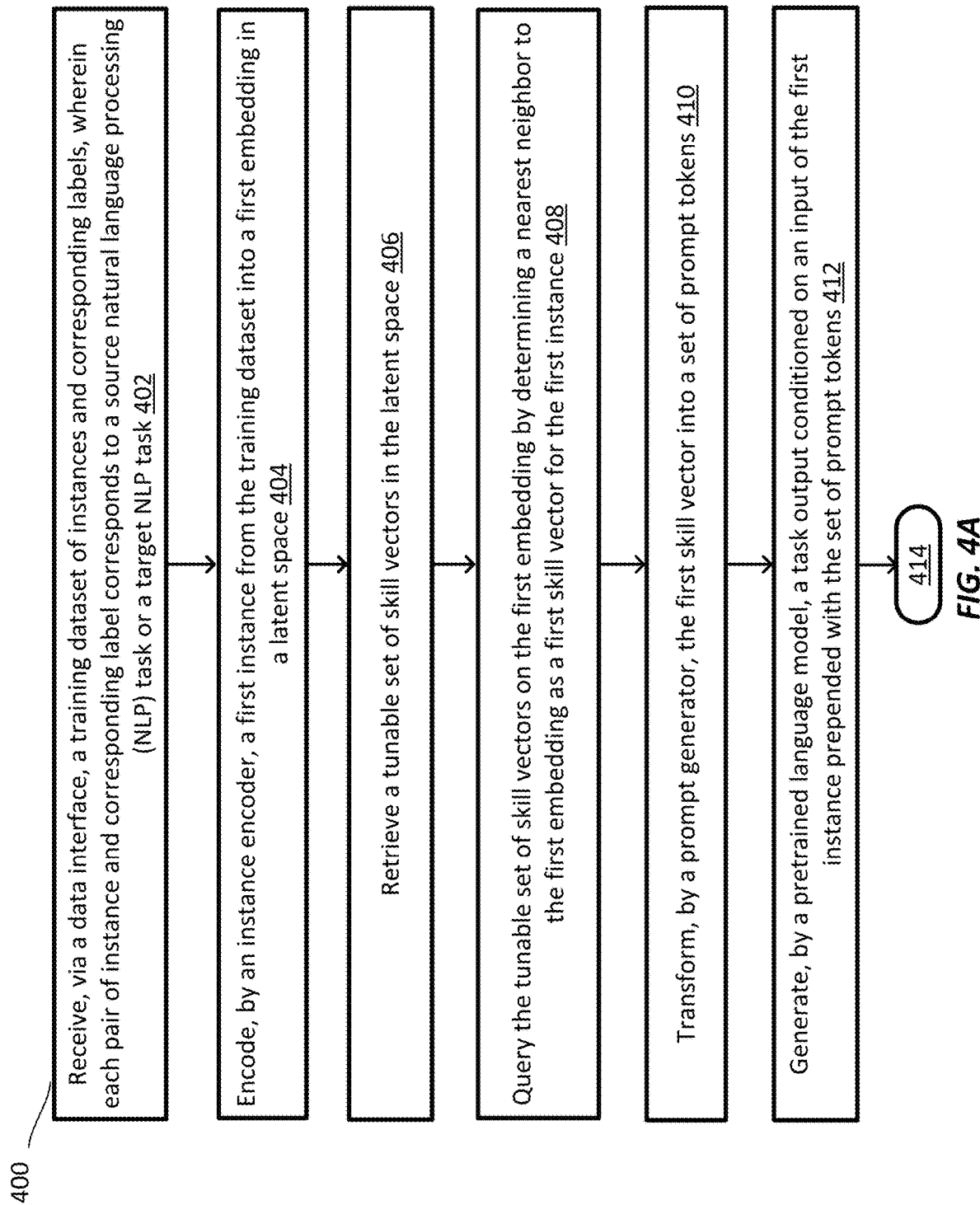
FIGS. 4A-4B provide an example logic flow diagram illustrating a method of shared prompt-tuning in language models, according to some embodiments described herein.
Figure 4B:
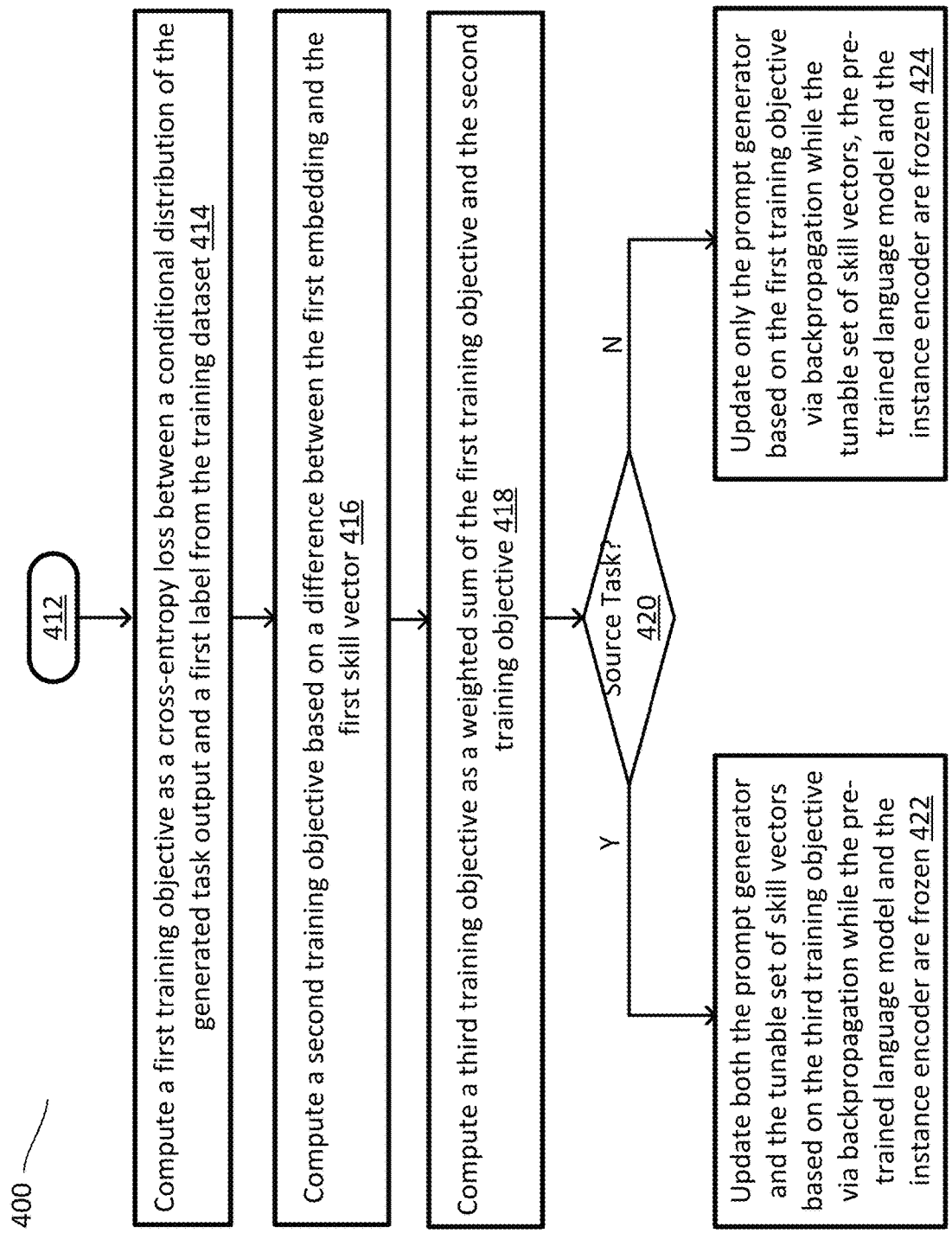

FIGS. 4A-4B provide an example logic flow diagram illustrating a method of shared prompt-tuning in language models, according to some embodiments described herein. One or more of the processes of method 400 may be implemented, at least in part, in the form of executable code stored on non-transitory, tangible, machine-readable media that when run by one or more processors may cause the one or more processors to perform one or more of the processes. In some embodiments, method 400 corresponds to the operation of the shared prompt-tuning module 230 (e.g., FIGS. 2-3).

At step 402, a training dataset of instances and corresponding labels are received, via a data interface (e.g., 215 in FIG. 2). Each pair of instance and corresponding label corresponds to a source natural language processing (NLP) task or a target NLP task.

At step 404, an instance encoder (e.g., 132 in FIG. 1) may encode a first instance from the training dataset into a first embedding (e.g., 112 in FIG. 1) in a latent space (e.g., 116 in FIG. 1).

At step 406, a tunable set of skill vectors are retrieved in the latent space (e.g., 116 in FIG. 1).

At step 408, the first embedding (e.g., 112 in FIG. 1) may query the tunable set of skill vectors on the first embedding by determining a nearest neighbor to the first embedding as a first skill vector (e.g., 118 in FIG. 1) for the first instance.

At step 410, a prompt generator (e.g., 133 in FIG. 1) may transform the first skill vector into a set of prompt tokens (e.g., 136 in FIG. 1).

At step 412, a pretrained language model (e.g., 131 in FIG. 1) may generate a task output (e.g., 150 in FIG. 1) conditioned on an input of the first instance (e.g., 140 in FIG. 1) prepended with the set of prompt tokens (e.g., 136 in FIG. 1).

At step 414, a first training objective (e.g., $L(\alpha)$) may be computed as a cross-entropy loss between a conditional distribution of the generated task output and a first label from the training dataset.

At step 416, a second training objective (e.g., $L(E)$) may be computed based on a difference between the first embedding and the first skill vector.

At step 418, a third training objective (e.g., $L(\alpha, E)$) may be computed as a weighted sum of the first training objective and the second training objectives.

At step 420, the method 400 determines whether the first instance belongs to a source task. When the first instance is selected from a mixture of source NLP tasks, method 400 proceeds to step 422, where both the prompt generator and the tunable set of skill vectors are updated based on the third training objective (e.g., $L(\alpha, E)$) via backpropagation while the pre-trained language model and the instance encoder are frozen. When the first instance is selected only for the target NLP task, method 400 proceed to step 424, where only the prompt generator is updated based on the first training objective (e.g., $L(\alpha)$) via backpropagation while the tunable set of skill vectors, the pre-trained language model and the instance encoder are frozen.

Example Data Experiments Performance

For high-to-low resource transfer, the target tasks may be low-resource tasks (less than 10K training examples), while the source tasks are high-resource tasks. The testing dataset consists of 25 tasks in total. There are 15 source tasks (e.g., DocNLI, DROP) and 10 target asks (e.g., BoolQ, ColA). The data test setting are kept almost the same as a major experiment in Vu et al., SPoT: Better frozen model adaptation through soft prompt transfer, in Proceedings of the 60th Annual Meeting of the Association for Computational Linguistics (Volume 1: Long Papers), pages 5039-5059, 2022, for a fair comparison, with the exception that C4 is excluded from the source task since it is much a larger dataset than other tasks. Excluding C4 does not affect SPOT performance since it does not provide an optimal source prompt for any target task.

In transfer across different task categories, the transferability from datasets is investigated in some task categories to datasets in other held-out task categories. Following Sanh et al., Multi-task prompted training enables zero-shot task generalization, in International Conference on Learning Representations, 2022, datasets are assumed in each category to measure a general NLP ability, and use the same taxonomy defined in Sanh et al. The source tasks include (1) QA tasks: ReCoRD, SQuAD, DROP, MultiRC, and RACE; (2) sentiment analysis tasks: Yelp-2 and SST-2; (3) a paraphrase detection task: QQP; (4) a semantic similarity task: CXC. The target tasks include (1) a sentence completion task: COPA; (2) NLI tasks: CB and RTE; (3) a coreference resolution tasks: WSC; (4) a word sense disambiguation task: WiC.

In training, all datasets are converted to a text-to-text format. All experiments are con-ducted with T5-base as the backbone unless stated.

SimCSE (Gao et al., SimCSE: Simple contrastive learning of sentence embeddings, in Empirical Methods in Natural Language Processing (EMNLP), 2021) model (BERT-base) are used as the instance encoder. Since the instance encoder is always frozen, the embeddings of all instances are pre-computed and only keep the embeddings. In source task training, the model (skill latent space and prompt generator) is simply tuned on the mixture of all source tasks for each setting. The model is tuned for 80K steps for the high-to-low setting, and 40K steps for the other setting. In learning and testing on target tasks, the model is tuned for 100K on each target task. A checkpoint every 500 steps, which is saved and report results on the checkpoint with the highest validation performance. The prompt generator generates 64 soft tokens in all experiments. The following hyperparameters are also shared in all target and source task training: learning rate (0.3), the number of warmup steps (4000), optimizer (Adam).

For high-to-low resource transfer, Table 1 in FIG. 5 shows the example results. The proposed method (referred to as SHARPT) are compared to methods with a comparable compute- and parameter-efficiency, PROMPT-TUNING (Lester et al., the power of scale for parameter-efficient prompt tuning, in Proceedings of the 2021 Conference on Empirical Methods in Natural Language Processing, pages 3045-3059, 2021) and SPOT-Retrieval (see Vu et al.). SHARPT demonstrates a clear improvement over the two methods across most tasks and on the average performance. SHARPT is also compared with much more expensive methods, SPOT-Oracle (see Vu et al.) and MODELTUNING. Note that SPOT-Oracle is significantly more expensive than SHARPT method since it tunes on each target task with each possible task prompt (e.g., it requires roughly 48 times more training time). While being much more efficient, SHARPT matches or outperforms SPOT-Oracle. Also, SHARPT performance is on par with the MODELTUNING performance which requires to tune the entire model. Together, these results indicate SHARPT is an efficient and competitive approach.

In transfer across different task categories, the results are shown in Table 2 of FIG. 6. SHARPT outperforms both PROMPTTUNING and SPOT methods. The improvement over SPOT methods is larger in this setting than in the high-to-low transfer setting. This might be because SPOT relies more on knowledge shared by tasks within in the same category, while SHARPT learns a shared latent space across all source tasks and is more able to leverage knowledge shared across datasets of different categories.

Figure 8:
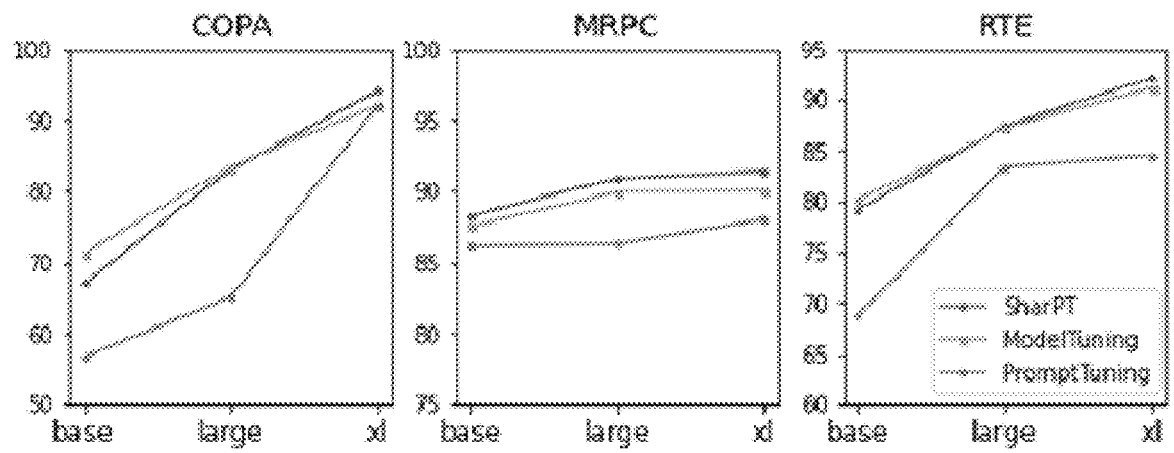

In across model scales, SHARPT can close the performance gap between full model tuning and prompt-based methods on a mid-sized model, T5-base (220M). Here conducts experiments with larger models, T5-large (800M) and T5-xl (3B) and compare SHARPT to MODELTUNING and PROMPTTUNING. As shown in FIG. 8, SHARPT matches or slightly outperforms MODELTUNING under the three model scales. Our method also shows considerable improvements over PROMPTTUNING.

Two key components of SHARPT are ablated: (1) training on source tasks; (2) skill latent space that captures shared knowledge. Example results are shown in Table 3 of FIG. 7. Clearly, knowledge learned from source tasks and encoded in the latent space is critical for target task performance.

Figure 9:
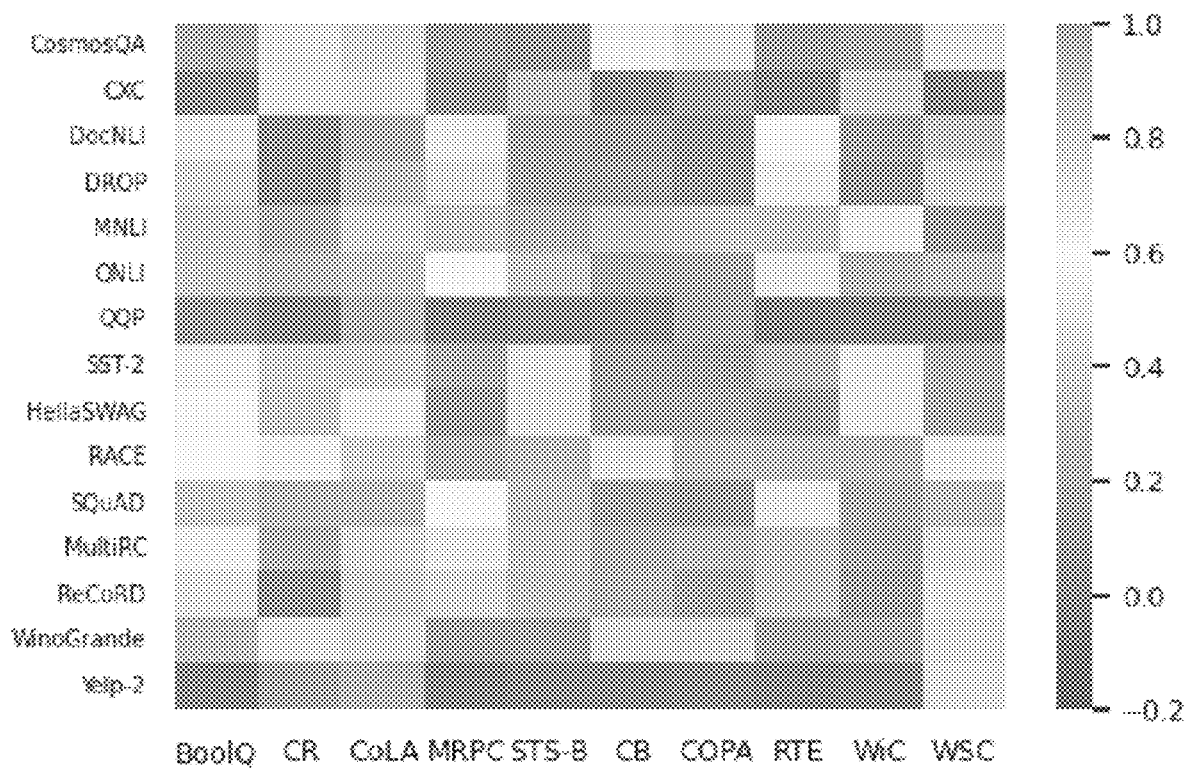

For task relations, it is investigated if the latent space captures source and target task relations to allow knowledge transfer. Each instance queries the latent space and selects one latent skill. This selection is converted to a one-hot vector and treat it as an instance encoding. A task representation is the average of instance encodings in the task. The cosine similarity between two task representations is computed as their relation. The relations between source and target tasks are visualized in FIG. 9. It seems that more complicated source tasks such as QA and NLI tasks transfer more knowledge to target tasks via the skill latent space.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of shared prompt-tuning in language models, the method comprising:
   receiving, via a data interface, a training dataset of instances;
   encoding, by an instance encoder, a first instance from the training dataset into a first embedding in a latent space;
   querying a skill latent space on the first embedding to obtain a first skill vector;
   transforming, by a prompt generator, the first skill vector into a set of prompt tokens;
   generating, by a pretrained language model, an answer in response to an input of the first instance prepended with the prompt tokens;
   computing a first training objective as a cross-entropy loss between a conditional distribution of the generated answer conditioned on the prompt generator and the first instance and a first label corresponding to the first instance from the training dataset;
   computing a second training objective based on a difference between a stop gradient operator over the first embedding and the first skill vector;
   computing a third training objective as a weighted sum of the first training objective and the second training objective; and
   updating the prompt generator based on the third training objective via backpropagation while the pre-trained language model and the instance encoder are frozen.

2. The method of claim 1, wherein the training dataset includes instances and corresponding labels, wherein each pair of instance and corresponding label corresponds to a source natural language processing (NLP) task or a target NLP task.

3. The method of claim 1, wherein the querying the skill latent space includes:
   retrieving a tunable set of skill vectors in the latent space; and
   querying the tunable set of skill vectors on the first embedding by determining a nearest neighbor to the first embedding as a first skill vector for the first instance.

4. The method of claim 1, further comprising:
   updating both the prompt generator and the tunable set of skill vectors based on the third training objective via backpropagation while the pre-trained language model and the instance encoder are frozen,
   when the first instance is selected from a mixture of source NLP tasks.

5. The method of claim 1, further comprising:
   updating only the prompt generator based on the first training objective via backpropagation while the tunable set of skill vectors, the pre-trained language model and the instance encoder are frozen,
   when the first instance is selected only for the target NLP task.

6. The method of claim 1, wherein the prompt generator is a light-weight multilayer perceptron (MLP).

7. The method of claim 1, wherein the set of prompt tokens are generated by at least a tangent transformation of a linear transformation of the first skill vector.

8. The method of claim 1, further comprising:
   pre-computing, by the instance encoder, embeddings for instances in the training dataset; and
   retrieving the first embedding for the first instance at training stage.

9. A system of shared prompt-tuning in language models, the system comprising:
   a data interface that receives a training dataset of instances;
   a memory storing an instance encoder, a skill vector generator, a prompt generator and a pretrained language model, and a plurality of processor-executable instructions; and
   one or more processors reading and executing the plurality of processor-executable instructions to perform:
      encoding, by the instance encoder, a first instance from the training dataset into a first embedding in a latent space;
      querying a skill latent space on the first embedding to obtain a first skill vector;
      transforming, by the prompt generator, the first skill vector into a set of prompt tokens;
      generating, by the pretrained language model, an answer in response to an input of the first instance prepended with the prompt tokens;
      computing a first training objective as a cross-entropy loss between a conditional distribution of the generated answer conditioned on the prompt generator and the first instance and a first label corresponding to the first instance from the training dataset;
      computing a second training objective based on a difference between a stop gradient operator over the first embedding and the first skill vector;
      computing a third training objective as a weighted sum of the first training objective and the second training objective; and
      updating the prompt generator based on the third training objective via backpropagation while the pre-trained language model and the instance encoder are frozen.

10. The system of claim 9, wherein the training dataset includes instances and corresponding labels, wherein each pair of instance and corresponding label corresponds to a source natural language processing (NLP) task or a target NLP task.

11. The system of claim 9, wherein an operation of querying the skill latent space includes:
   retrieving a tunable set of skill vectors in the latent space; and
   querying the tunable set of skill vectors on the first embedding by determining a nearest neighbor to the first embedding as a first skill vector for the first instance.

12. The system of claim 9, wherein the operations further comprise:
   updating both the prompt generator and the tunable set of skill vectors based on the third training objective via backpropagation while the pre-trained language model and the instance encoder are frozen,
   when the first instance is selected from a mixture of source NLP tasks.

13. The system of claim 9, wherein the operations further comprise:
   updating only the prompt generator based on the first training objective via backpropagation while the tunable set of skill vectors, the pre-trained language model and the instance encoder are frozen, when the first instance is selected only for the target NLP task.

14. The system of claim 9, wherein the prompt generator is a light-weight multilayer perceptron (MLP).

15. The system of claim 9, wherein the set of prompt tokens are generated by at least a tangent transformation of a linear transformation of the first skill vector.

16. A non-transitory processor-readable storage medium storing a plurality of processor-executable instructions for shared prompt-tuning in language models, the instructions being executed by one or more processors to perform operations comprising:

receiving, via a data interface, a training dataset of instances;

encoding, by an instance encoder, a first instance from the training dataset into a first embedding in a latent space;

querying a skill latent space on the first embedding to obtain a first skill vector;

transforming, by a prompt generator, the first skill vector into a set of prompt tokens;

generating, by a pretrained language model, an answer in response to an input of the first instance prepended with the prompt tokens;

computing a first training objective as a cross-entropy loss between a conditional distribution of the generated answer conditioned on the prompt generator and the first instance and a first label corresponding to the first instance from the training dataset;

computing a second training objective based on a difference between a stop gradient operator over the first embedding and the first skill vector;

computing a third training objective as a weighted sum of the first training objective and the second training objective; and updating the prompt generator based on the third training objective via backpropagation while the pre-trained language model and the instance encoder are frozen.

* * * * *